United States Patent [19]
Wetzel

[11] Patent Number: 5,939,812
[45] Date of Patent: Aug. 17, 1999

[54] COLLECTOR MACHINE WITH HOUSING CONTACTING

[75] Inventor: Gerhard Wetzel, Korntal-Muenchingen, Germany

[73] Assignee: Robert Bosch GmbH, Stuttgart, Germany

[21] Appl. No.: 08/996,217

[22] Filed: Dec. 22, 1997

[30] Foreign Application Priority Data

Dec. 24, 1996 [DE] Germany .............................. 196 54 352

[51] Int. Cl.$^6$ .............................. H02K 13/00; H02K 5/14
[52] U.S. Cl. .............................................. 310/245; 310/239
[58] Field of Search ................................. 310/239, 242, 310/245, 246, 247, 249, 71; 29/596, 598

[56] References Cited

U.S. PATENT DOCUMENTS

| | | | |
|---|---|---|---|
| 4,673,837 | 6/1987 | Gingerich et al. | 310/239 |
| 4,851,730 | 7/1989 | Fushiya et al. | 310/249 |
| 4,855,631 | 8/1989 | Sato et al. | 310/239 |
| 5,089,735 | 2/1992 | Sawaguchi et al. | 310/88 |
| 5,343,102 | 8/1994 | Mabuchi et al. | 310/71 |
| 5,598,045 | 1/1997 | Ohtake et al. | 310/40 MM |
| 5,631,513 | 5/1997 | Coles et al. | 310/239 |
| 5,634,819 | 6/1997 | Pan et al. | 439/637 |
| 5,648,695 | 7/1997 | Yamaguchi et al. | 310/242 |
| 5,753,993 | 5/1998 | Steidle et al. | 310/239 |

FOREIGN PATENT DOCUMENTS

| | | |
|---|---|---|
| 1150185 | 4/1969 | Germany . |
| 31 40 057 A1 | 5/1982 | Germany . |
| 33 14 412 C2 | 2/1991 | Germany . |
| 2013042 | 1/1979 | United Kingdom . |

OTHER PUBLICATIONS

Bosch Techn. Berichte 8, pp. 198–205.

*Primary Examiner*—Clayton LaBalle
*Assistant Examiner*—Tran N Nguyen
*Attorney, Agent, or Firm*—Edwin E. Greigg; Ronald E. Greigg

[57] ABSTRACT

The invention relates to a collector machine, in particular an electric motor, having a rotor, rotatably supported in a housing and having an armature winding and a collector. The collector for electrically contacting the armature winding cooperates with at least two brushes resting slidingly on the collector, which are each displaceably guided counter to an initial tension in a respective quiver provided for each brush on a brush carrier plate. In accordance with the improvement according to the invention, at least one contact element, which is part of an associated quiver and for one pole of the electrical contacting establishes an electrically conductive contact with the housing.

7 Claims, 2 Drawing Sheets

COLLECTOR MACHINE WITH HOUSING CONTACTING

BACKGROUND OF THE INVENTION

The invention relates to a collector machine such as an electric motor.

British Patent GB 1 150 185 discloses a collector machine that has a magnet frame, which has magnet poles, two bearing plates that receive bearings for a rotor and are deep-drawn from sheet metal, and a collector and a brush carrier plate. The bearing plate toward the collector has two bearing parts, which protrude substantially transversely from a substantially platelike part of the bearing plate extending around the bearing and which are firmly connected to the magnet frame. A brush carrier plate is secured between the bearing parts in the vicinity of the bearing toward the collector. The brush carrier plate carries carbon brushes, pressed elastically against the collector, and radio distortion suppressors. In a further feature, described in German Patent DE-PS 33 14 412, electric connection means for electrical wiring of the radio distortion suppressors are provided on the brush carrier plate. To connect the circuit ground of the radio distortion suppressors to the collector-side bearing plate, a contact clip provided with claws is formed onto one of the electric connection means; the clip rests laterally on a load-bearing part of the collector-side bearing plate and thus establishes an electrical contact.

The ground contacting formed in this way is relatively complicated and expensive, since special connection means must be provided on the brush carrier plate and bent in a relatively complicated way into a contact clip for the sake of ground contacting. Since the contact clip rests laterally on the load-bearing part, the contact face is moreover relatively small in area, so that vibration during operation of the collector machine can lead to uneven ground contacting.

German Patent Disclosure DE-OS 31 40 057 A1 discloses an electric motor with suppression of high-frequency interfering radiation. A plurality of distortion suppression capacitors serving the purpose of radio distortion suppression are arranged on an annular support part and are connected via the annular support part, by their terminal not connected to the brush, to the housing ground. In the electric motor disclosed in this reference, direct ground contacting of the brush connected to the ground pole of the supply voltage is not provided, however, and hence only a relatively low degree of distortion suppression is achieved.

OBJECT AND SUMMARY OF THE INVENTION

The collector machine according to the invention has the advantage that the brush connected to the circuit ground of the supply voltage is connected electrically directly to the housing. As a result, when the brush carrier plate is inserted into the housing of the collector machine, an electrical contact between the ground potential of the supply voltage and the housing is thus already achieved in an especially simply way. External ground contacting, for instance by connection to an external grounding strip, can be dispensed with, and a complicated soldered, screw or rivet connection for ground contacting of the housing is not needed. This substantially simplifies mounting the collector machine of the invention to the body of the motor vehicle, so that expenses for mounting can be reduced. Compared with a collector machine without ground-contacted housing, a considerably improved degree of radio distortion suppression is obtained. The provision according to the invention requires only slight structural changes in the collector machine, so that the ground contacting of the housing can be incorporated into an existing production concept.

By means of the provisions recited hereinafter, advantageous further refinements of and improvements to the collector machine are possible.

In an especially advantageous way, the contact element that makes the contact with the housing can form the end plate of the quiver; a reliable electrical connection between the brush carrying the ground potential and the contact element is achieved by means of a spring disposed inside the quiver and serving to prestress the brush. A bent contact tab can be formed, preferably integrally, onto the end plate and upon insertion of the brush carrier plate, for instance into the pole pot of the housing, it makes the electrical contact with the surrounding pole pot. The contact element can advantageously be stamped out of a strip of sheet metal and deformed to the shape according to the invention, without significantly increasing the production effort or expense. The quivers, connected to the opposite pole of the supply voltage and on which no contact element is provided, preferably have a plastic end plate, which can be made in one piece with the brush carrier plate and can be bent at an angle relative to the brush carrier plate by means of a film hinge. The quivers are especially advantageously designed in the same way for all the brushes, and the quiver serving the purpose of ground contacting of the housing is merely varied in such a way that instead of the end plate of a plastic material, a metal end plate is used, on which a contact tab for contacting with the housing is preferably formed. The contact can be slit once or multiple times, in order to assure that the contact tab, resting resiliently on the surrounding housing part, will rest on a plurality of bearing points.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
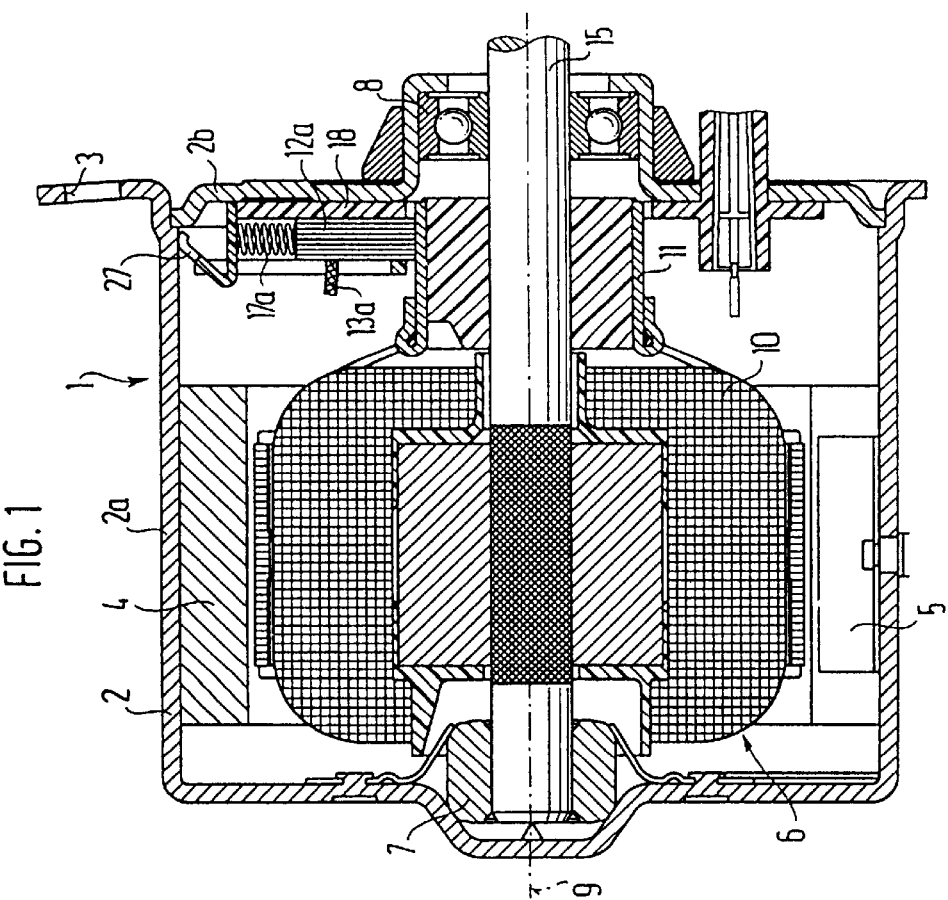
FIG. 1 is an axial longitudinal section through an exemplary embodiment of the collector machine of the invention.

FIG. 1 shows an axial longitudinal section through an exemplary embodiment of a collector machine 1 according to the invention, operating as an electric motor. The collector machine 1 may for instance be used as a drive device to drive a pump inside an anti-lock brake system (ABS). However, the invention relates not merely to a collector machine 1 embodied as an electric motor; the collector machine 1 can be used in the same way as a generator, for instance, for charging the battery of a motor vehicle. Particularly in the case of collector machines used in the field of motor vehicles, radio distortion suppression is especially important, to assure interference-free operation of a car radio, mobile telephone, or the like.

A housing 2 of the collector machine 1 comprises a pole pot 2a and a front panel 2b inserted into the pole pot 2a. To secure the collector machine 1 on the body of a motor vehicle, for instance, the housing 2 has two suitable fastening bores 3. In the collector machine 1, which in the exemplary embodiment functions as a DC electric motor, poles 4, 5 of a permanent magnet or of an electromagnet are disposed inside the pole pot 2a in order to form the magnetic field of the stator. Inside the housing 2, a rotor 6 is supported in bearings 7 and 8 so as to be rotatable about a longitudinal axis 9. The rotor 6 has an armature winding 10, which is connected via a collector 11, acting as a commutator, and at least two brushes, and in the exemplary embodiment four brushes 12a–12d, better seen in FIG. 2, to supply lines 13a and 13b. The rotor 6 of the collector machine 1, acting as an electric motor in the exemplary embodiment, outputs its torque via the output shaft 15.

Figure 2:
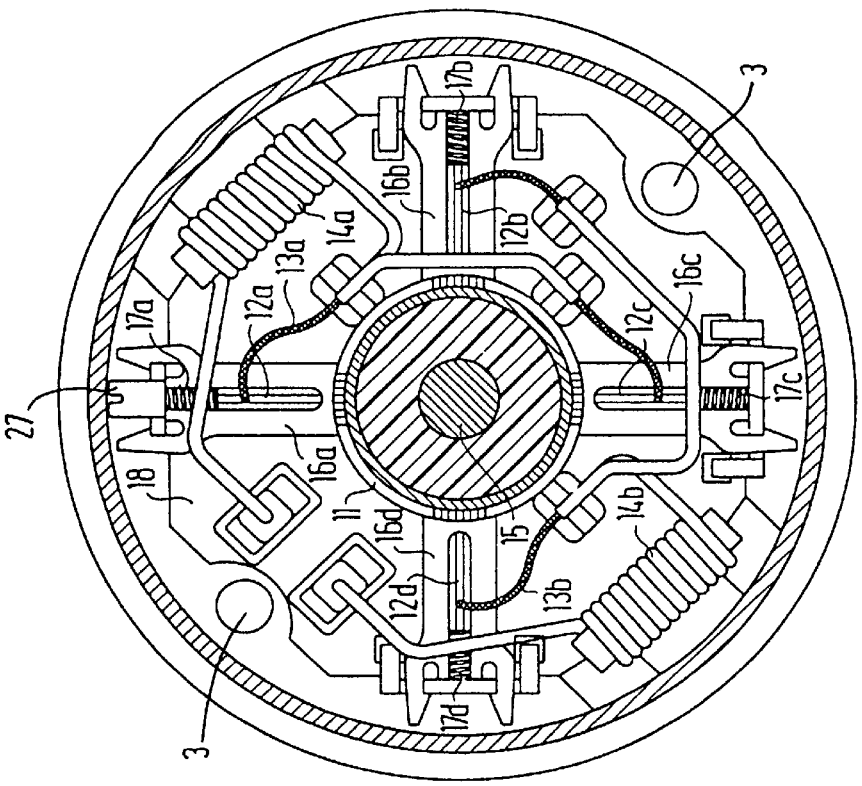
FIG. 2 is a cross section in the region of the brush carrier plate of the collector machine shown in FIG. 1.

As can be seen from FIG. 2, in the exemplary embodiment shown the brushes are connected in pairs to one each of the supply lines 13a, 13b. That is, in the exemplary embodiment, the brushes 12a and 12c are connected to the supply line 13a, while the brushes 12b and 12d are connected to the other supply line 13b. For radio distortion suppression, choke coils 14a and 14b are connected to the supply lines 13a and 13b, and these coils are wired together with distortion suppression capacitors in a manner known per se. The brushes 12a–12d, preferably embodied as carbon brushes, are guided displaceably in quivers 16a–16d that surround the brushes 12a–13d on five sides, and are each prestressed in the direction of the collector 11 by means of a respective spring 17a–17d in such a way that they rest slidingly on the collector 11.

Figure 3:
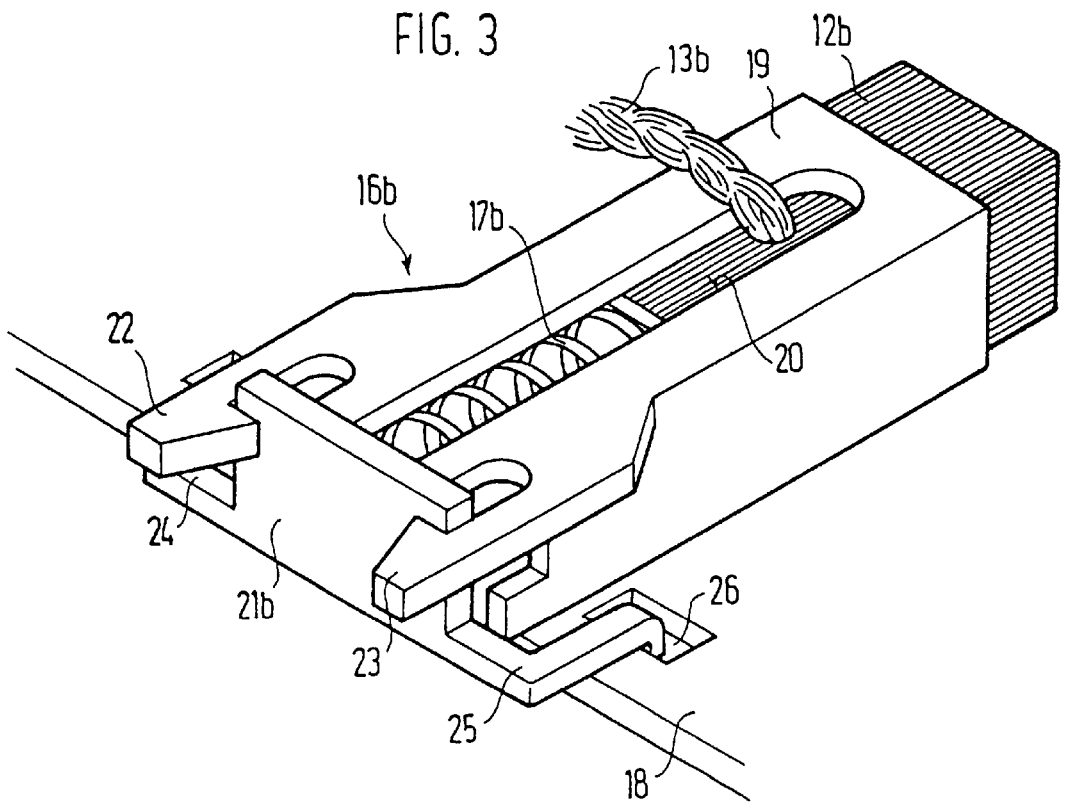
FIG. 3 is a perspective view of a quiver for receiving a brush.
Figure 4:
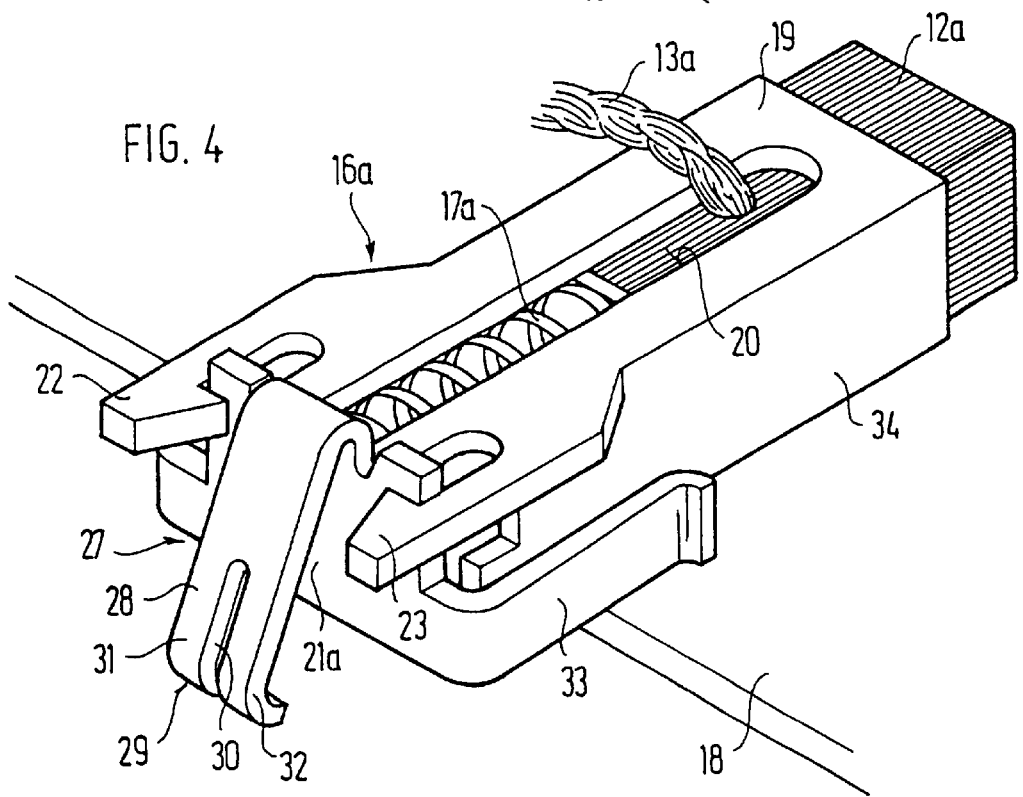
FIG. 4 is a perspective view of a quiver for receiving a brush with which the contact element according to the invention is integrated.

FIGS. 3 and 4 show enlarged perspective views of the quivers 16a and 16b, so that the embodiment of the quivers can better be seen in detail.

The quiver 16b shown in FIG. 3 serves to connect the supply line 13b to the pole of the supply voltage that is not connected to the circuit ground. The quiver 16b is embodied essentially as a hollow parallelepiped and is manufactured, preferably integrally, with a brush carrier plate 18, for instance by means of a plastic injection molding process. The brush carrier plate 18, better seen in FIG. 2, joins together all the quivers 16a–16d and at the same time serves to mount the chokes 14a and 14b. The brush carrier plate 18 can in turn be mounted on the front panel 2b of the housing 2. Each of the quivers 16b and 16a shown in FIGS. 3 and 4 has a respective slit 20 on its top 19, through which the supply line 13b or 13a, associated with the respective brush 12b or 12a, can be passed through the quiver 16b and 16a, respectively. By means of the respective spring 17a and 17b, the brushes 12a and 12b are pressed against the collector 11, thus producing a good sliding electrical contact. In addition, shortening of the carbon brushes 12a and 12b from abrasion is compensated for by the springs 17a and 17b. The slit 20 extends in its length far enough that the supply by the supply lines 13a and 13b is unhindered even in the event of major abrasion of the brushes 12a and 12b. The springs 17a and 17b are supported respectively on an end plate 21a and 21b, opposite the brush 12a and 12b, of the quiver 16a and 16b.

The supply line 13b associated with the quiver 16b is not connected to the circuit ground of the supply voltage. Consequently, the supply line 13b cannot be contacted with the housing 2, either. The end plate 21b therefore preferably comprises a plastic material and can be embodied in one piece with the brush carrier plate 18, for instance by producing them jointly using a plastic injection molding process. Polyamide is suitable for instance as the plastic material for forming the brush carrier plate 18, the quivers 16a–16d formed onto the brush carrier plate 18, and the end plates 21b through 21d. The end plate 21b shown in FIG. 3 is joined to the brush carrier plate 18 via a film hinge and can be folded over at this plastic hinge. The end plate 21b can be fixed in the position shown in FIG. 3, bent at a right angle relative to the brush carrier plate 18, by snapping into the detent hooks 22 and 23. For further fixation, lateral retaining arms 24 and 25 lockingly engage recesses 26 provided laterally of the quiver 16b in the brush carrier plate 18. In this way, the brush 12b is surrounded protectively on five sides by the quiver 16b, and the spring 17b can be integrated inside the quiver 16b.

As already described, by means of the further feature of the invention the supply line connected to the ground pole of the supply voltage, which in the exemplary embodiment is the supply line 13a, is intended to be electrically connected to the housing 2 of the collector machine 1, preferably to the pole pot 2a. This is accomplished by the slightly modified quiver 16a shown in FIG. 4. The quiver 16a shown in FIG. 4 differs from the quiver 16b already described in conjunction with FIG. 3 in that it is not the plastic end plate 21b but rather a metal contact element 27 that is inserted into the detent hooks 22 and 23. The contact element 27 forms the end plate 21a of the quiver 16a, on which plate the spring 17a rests and creates an electrical connection between the brush 12a and the contact element 27. A contact tab 28 is formed onto the end plate 21a, integrally in this exemplary embodiment. On its end 29 remote from the end plate 21a, the contact tab 28 has a slit 30, which divides the contact tab 28 into two partial tabs 31 and 32, and as can be seen from FIG. 1 it rests resiliently on the pole pot 2a of the housing 2. The division of the contact tab 28 into the partial tabs 31 and 32 has the advantage, in the case where the orientation of the contact tab 28 is not completely parallel with the wall of the pole pot 2a, that the partial tabs 31 and 32 rest at at least multiple points on the pole pot 2a, so that the contact resistance is reduced compared with contact at only one point. This can be still further improved by making the contact tab 28 with not merely a single slit but multiple slits.

One retaining clamp is formed onto each of the two sides of the end plate 21a, and of these clamps only the retaining clamp 33 can be seen in FIG. 4. The retaining clamp 33 rests nonpositively on a side wall 34 of the quiver 16a, and the opposite retaining clamp likewise rests nonpositively on the opposite side wall of the quiver 16a, thus improving the fixation of the contact element 27 on the quiver 16a.

With the described further feature of the invention, an electrical connection between the housing 2 and the supply line 13a, connected to the ground pole of the supply voltage, can therefore be attained in a simple manner without necessitating an external ground connection for the housing. The ground housing contacting can be incorporated into the fundamental construction concept of the quivers described in conjunction with FIG. 3. The only variation necessary to attain this would be to replace the insulating end plate 21b with a conductive, preferably metal contact element 27, whose contact tab 28 establishes the necessary housing contact. In the exemplary embodiment shown, as can be seen from FIG. 2, only the quiver 16a is equipped with the contact element 27. In addition, however, it is also possible to equip the quiver 16c, connected to the supply line 13a carrying the ground potential, with such a contact element 27 as well, in order to provide an additional housing contacting on the diametrically opposite side. As a result, the contact resistance can be reduced still further if needed.

With the ground contacting according to the invention of the pole pot 2a, in cooperation with two distortion suppression chokes and one distortion suppression capacitor for the collector machine 1 described, the degree of distortion suppression UKW=5 can be achieved. By comparison, if two distortion suppression chokes and one distortion suppression capacitor are used but without the ground contacting according to the invention of the pole pot 2a, the degree of distortion suppression attainable is only UKW=4.

The foregoing relates to a preferred exemplary embodiment of the invention, it being understood that other variants and embodiments thereof are possible within the spirit and scope of the invention, the latter being defined by the appended claims.

I claim:

1. A collector machine (1), having a rotor (6), rotatably supported in a housing (2), said rotor having an armature winding (10) and an electrical contacting collector (11), said electrical contracting collector (11) cooperates with a plurality of brushes (12a–12d), said brush rest slidingly on the collector 11 for electrically contacting the armature winding (10), said brushes are displaceably guided counter to an initial tension in a quiver (16a–16d) by a spring provided one for each brush (12a–12d) on a brush carrier plate (18), a contact element (27) being a part of a quiver (16a) and for one pole of the electrical contacting collector establishes an electrically conductive contact with the housing (2), said spring (17a) is disposed in one each of said quiver (16a) in contact with said contact element (27), said spring exerts an initial tension on said each brush being displaceable in the quiver (16a) and said spring is braced against an end plate (21a), the end plate (21a) is formed by the contact element (27) and is electrically conductively connected to said each brush via the spring (17a) and to the housing (2), each contact element (27) of each quiver has a contact tab, being bent relative to the end plate (21a), formed by the contact element (27) and said tab rests on and is in electrical contact with a pole pot housing part (2a), surrounding the brush carrier plate (18), and said contact tab (28) is slit at least once in an end region (29) resting on the housing part (2a).

2. A collector machine (1), having a rotor (6), rotatably supported in a housing (2), said rotor having an armature winding (10) and an electrical contacting collector (11), said electrical contracting collector (11) cooperates with a plurality of brushes (12a–12d), said brush rest slidingly on the collector 11 for electrically contacting the armature winding (10), said brushes are displaceably guided counter to an initial tension in a quiver (16a–16d) by a spring provided one for each brush (12a–12d) on a brush carrier plate (18), a contact element (27), being a part of a quiver (16a) and for one pole of the electrical contacting collector establishes an electrically conductive contact with the housing (2), said spring (17a) is disposed in each of said quiver (16a) in contact with said contact element (27), said spring exerts an initial tension on said each brush being displaceable in the quiver (16a) and said spring is braced against an end plate (21a), the end plate (21a) is formed by the contact element (27) and is electrically conductively connected to said each brush (12a) via the spring (17a) and to the housing (2), said contact element (27) of each quiver has a contact tab, being bent outwardly from the end plate (21a) formed by the contact element (27) and said tab rests on and is in electrical contact with a pole pot housing part (2a), surrounding the brush carrier plate (18).

3. A collector machine in accordance with claim 2, in which at least one retaining clamp (33), said clamp rests on a side face (34) of the quiver (16a) is formed onto the end plate (21a).

4. A collector machine in accordance with claim 2, in which at least one retaining arm (24, 25), which engages the brush carrier plate (18) is formed onto the end plate (21a).

5. A collector machine in accordance with claim 2, in which the contact element (27) is made of a metal.

6. A collector machine in accordance with claim 2, in which each quiver (16a–16d) on a side remote from the brush carrier plate (18), has a slit (20), through said slit a supply line (13a, 13b) is extended to the brush (12a–12d).

7. A collector machine in accordance with claim 2, in which the end plate (21a) is fixable on the quiver (16a) by means of detent hooks (22, 23).

\* \* \* \* \*